Aug. 30, 1949.   P. ROSENBERG ET AL   2,480,199

REFLECTOR

Filed July 9, 1945

INVENTOR
PAUL ROSENBERG
RAYMOND L. GARMAN
BY
William D. Hall.
ATTORNEY

Patented Aug. 30, 1949

2,480,199

UNITED STATES PATENT OFFICE 2,480,199

REFLECTOR

Paul Rosenberg, Brookline, and Raymond L. Garman, Cambridge, Mass., assignors, by mesne assignments, to the United States of America as represented by the Secretary of War Application July 9, 1945, Serial No. 604,057

10 Claims. (Cl. 177—386)

This invention relates to reflectors and more particularly to supersonic wave reflectors designed to produce a desired radiation pattern.

It is sometimes desirable to simulate the operation of radio object-locating systems by the use of supersonic pulses transmitted through a liquid medium. A pulse of supersonic energy may be radiated in the form of a "pencil beam" directly from a crystal holder as described in the copending application of Paul Rosenberg, Serial No. 604,056, filed July 9, 1945.

This pencil beam is entirely satisfactory in many applications, but in some applications it is desirable to form the radiation pattern of the pulse of supersonic energy to correspond to the actual radiation pattern of the particular radio object-locating device to be simulated.

It is an object of the present invention, therefore, to present a method whereby the beam of energy obtained from the crystal holder described in the above-mentioned copending application or any similar device may be formed in a radiation pattern similar to that of a selected radio object-locating system.

In accordance with the present invention there are provided a suitable reflecting means and means of supporting said reflecting means in such a position that a pulse of supersonic energy will be directed in the desired direction.

For a better understanding of the invention, together with other and further objects thereof, reference is had to the following description taken in connection with the accompanying drawings in which.

Figure 1:
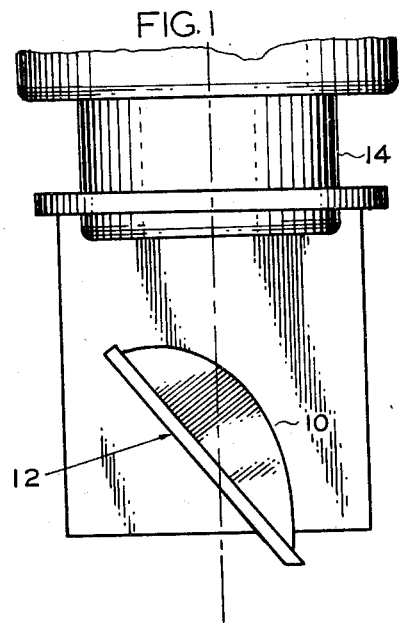
Fig. 1 is a simplified elevation showing a reflector and the support for the reflector.

Referring now more particularly to Fig. 1 of the drawings, there is shown a reflector 10 mounted on a support 12. Support 12 is designed to be attached to a crystal cartridge 14. This crystal cartridge is of the type described in the above-mentioned copending application. Reflector 10 may be a piece of optical glass that has been ground to the proper shape, or it may be a piece of metal that has a highly polished surface. Although thickness of the metal reflector and the shape of the back side thereof are not generally of prime importance, it may be necessary in some instances to take these factors into consideration to obtain optimum results.

Figure 2:
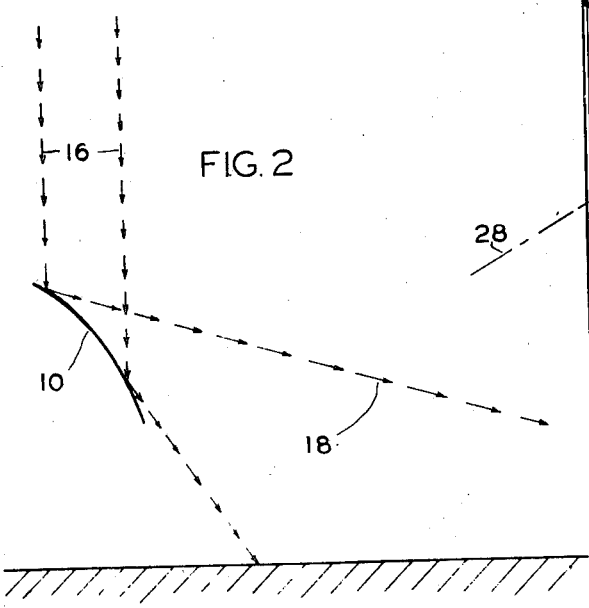
Fig. 2 is a schematic view showing the manner in which the desired radiation pattern is formed.
Figure 3:
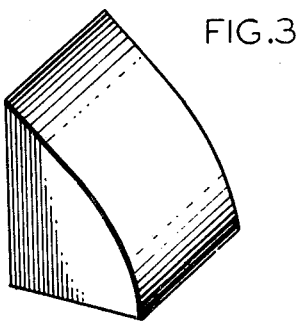
Fig. 3 is a pictorial view of a reflector designed to shape the beam in one direction.

Fig. 2 shows how the energy from cartridge 14, Fig. 1, traveling along the lines indicated by arrows 16 is deflected by reflector 10 so that the energy will form the pattern indicated by the arrows 18. The pattern formed by the supersonic energy as it leaves reflector 10 is substantially the same as the pattern that would result if a beam of light equal in size to the beam of supersonic energy from the crystal was directed at reflector 10. While Fig. 2 is not drawn to represent any particular type of beam pattern, the pattern shown in this figure is similar to the type of beam patttern known as the cosecant-squared beam in radio object-locating systems. Fig. 3 shows the shape of the reflector that is used to simulate the cosecant-squared beam pattern.

Figure 4:
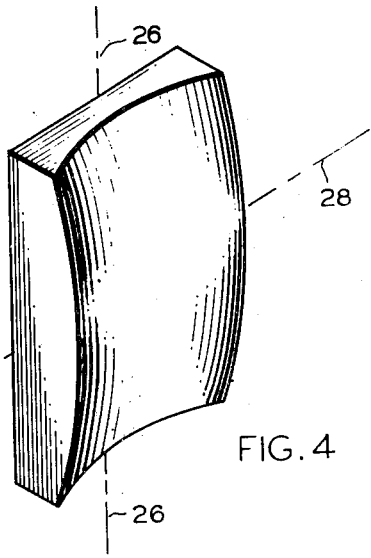
Fig. 4 is a pictorial view of a reflector designed to shape the beam in two directions.

Referring now to Fig. 4, there is shown a reflector 24 that is curved in two mutually perpendicular directions represented by lines 26 and 28 respectively. The curvature in the plane including line 26 and perpendicular to line 28 is such that the radiation pattern of the supersonic pulse is formed to correspond to the radiation pattern of the radio object-locating system. The curvature in the plane including line 28 and perpendicular to line 26 is such that the radiation pattern of the supersonic pulse is made to come to a focus at approximately the middle of the range to be covered. This results in a much narrower effective beam width than could be obtained without the reflector. This is an advantage since the beam width of the supersonic system without the reflector is proportionally much greater than the corresponding beam width in the radio object-locating system. The curvature in the plane including line 28 and perpendicular to line 26 may be varied continuously throughout the length of the reflector in such a manner as to obtain focus of the supersonic pulse thoughout the entire range to be covered or to obtain any desired pattern simulating the antenna pattern of any given radio object-locating system.

It can be seen that this method of forming a desired beam pattern possesses many advantages. The reflectors are relatively simple; they require no elaborate mounting, they are easily changed, and a single crystal may be used to simulate almost any number of different radio object-locating sets simply by changing reflectors.

While there have been described what are at present considered the preferred embodiments of the invention, it will be obvious to those skilled in the art that various changes and modifications

What is claimed is:

1. The combination of a supersonic generator including a crystal generator generating a pulsed, substantially parallel, beam of supersonic energy, and a reflector in the path of said beam, said reflector having a reflecting surface, said surface being shaped to convert said beam into a diverging beam in a first plane, and a converging beam in the second plane, said second plane being perpendicular to said first plane.

2. The combination of a supersonic generator generating a pulsed, substantially parallel, beam of supersonic energy, and a reflector receiving said beam said reflector having a concavo-convex reflecting surface reflecting said beam as a divergent beam in the first plane, and as a convergent beam in the second plane, said first plane being perpendicular to said second plane.

3. The combination of a supersonic generator capable of generating a substantially parallel beam of supersonic energy and a reflector to receive and reflect said beam as a divergent beam in one direction and a convergent beam in another direction, said reflector including a reflecting surface which is convex in one direction and concave in another.

4. The combination as defined in claim 3, wherein the directions of convexity and concavity are mutually perpendicular.

5. In an object-locating system, a reflector of supersonic energy, said reflector having a surface for reflecting said supersonic energy which surface is curved convexly in one direction and concavely in a second direction whereby to diverge and converge the reflected beam in two directions respectively.

6. The combination defined in claim 5, wherein the directions of convexity and concavity of said surface for reflecting supersonic energy are mutually perpendicular.

7. In a system for simulating a radiation pattern of a radio object-locating system, a parallel beam of supersonic energy, a reflector positioned in the path of said beam, said reflector having a reflecting surface interposed in the path of said beam to reflect said beam as a diverged beam in one direction and a converged beam in another direction, said surface being curved convexly in one direction and concavely in another.

8. A reflector for converging a beam of supersonic energy in one direction and diverging it in another, including a single reflecting surface, said surface having simultaneously two degrees of curvature, being curved concavely in one direction and convexly in another.

9. A reflector as defined in claim 8, wherein the directions of concavity and convexity of said single reflecting surface are mutually perpendicular.

10. The combination of a supersonic generator, generating a substantially parallel beam of supersonic energy, and a reflector angularly placed in the path of said beam, said reflector having a single compound reflecting surface with two degrees of curvature at right angles to each other, one curvature being convex to transform said beam into a divergent beam in the plane of said convex curvature and the other surface being concave and forming the beam reflected in the same direction as the divergent beam.

PAUL ROSENBERG.
RAYMOND L. GARMAN.

REFERENCES CITED

The following references are of record in the file of this patent:

UNITED STATES PATENTS

| Number | Name | Date |
| --- | --- | --- |
| 1,980,171 | Amy | Nov. 13, 1934 |
| 2,005,741 | Hayes | June 25, 1935 |
| 2,044,620 | Matthai | June 16, 1936 |
| 2,064,911 | Hayes | Dec. 22, 1936 |
| 2,076,330 | Wood et al. | Apr. 6, 1937 |
| 2,345,472 | Goldsmith | Mar. 28, 1944 |

FOREIGN PATENTS

| Number | Country | Date |
| --- | --- | --- |
| 28,297 | Great Britain | 1912 |
| 23,166 | Great Britain | Oct. 19, 1906 |